US006886741B1

(12) United States Patent
Salveson (10) Patent No.: US 6,886,741 B1
(45) Date of Patent: May 3, 2005

(54) ELECTRONIC TRANSACTION SYSTEM (76) Inventor: Melvin E. Salveson, 515 Ocean Ave., Suite 405S, Santa Monica, CA (US) 90402-2623

( * ) Notice: Subject to any disclaimer, the term of this patent is extended or adjusted under 35 U.S.C. 154(b) by 0 days.

(21) Appl. No.: 10/795,737

(22) Filed: Mar. 8, 2004

(51) Int. Cl.[7] .............................................. G06F 17/00
(52) U.S. Cl. ...................... 235/375; 235/379; 235/380; 705/14; 705/34; 705/39; 705/40
(58) Field of Search ................................ 235/379, 375, 235/380, 449; 705/14, 34, 40, 39

(56) References Cited

U.S. PATENT DOCUMENTS

| 1,951,596 | A | | 3/1934 | Creesy |
| 3,376,661 | A | | 4/1968 | Hulett |
| 3,434,414 | A | | 3/1969 | Wright |
| 4,443,027 | A | | 4/1984 | McNeely et al. |
| 4,593,936 | A | | 6/1986 | Opel |
| 4,634,848 | A | | 1/1987 | Shinohara et al. |
| 4,700,055 | A | | 10/1987 | Kashkashian, Jr. |
| 5,844,230 | A | | 12/1998 | Lalonde |
| 6,427,911 | B1 | * | 8/2002 | Barnes et al. ................ 235/380 |
| 6,705,520 | B1 | * | 3/2004 | Pitroda et al. ............ 235/382.5 |
| 6,715,679 | B1 | * | 4/2004 | Infosino ...................... 235/449 |
| 6,749,114 | B2 | * | 6/2004 | Madani ....................... 235/380 |
| 2002/0013728 | A1 | * | 1/2002 | Wilkman ...................... 705/14 |
| 2003/0209599 | A1 | * | 11/2003 | Gatto .......................... 235/379 |
| 2003/0209608 | A1 | * | 11/2003 | Blossom ..................... 235/492 |
| 2004/0024703 | A1 | * | 2/2004 | Roskind ....................... 705/40 |
| 2004/0073511 | A1 | * | 4/2004 | Beaumont et al. ............ 705/42 |
| 2004/0117250 | A1 | * | 6/2004 | Lubow et al. ................ 705/14 |
| 2004/0117255 | A1 | * | 6/2004 | Nemirofsky et al. .......... 705/14 |

* cited by examiner

*Primary Examiner*—Thien M. Le
*Assistant Examiner*—Allyson N Trail
(74) *Attorney, Agent, or Firm*—Stetina Brunda Garred & Brucker (57) ABSTRACT An all-purpose transaction system using a universal card is disclosed herein. The universal card is issued by a transaction card processing center (TCPC) and can be used for various purposes and to conduct a variety of transactions, such as retail transactions, financial transactions, security purposes, information purposes, civil purposes and for other purposes. The transactions may include purchases and payments. The universal card allows a consumer/cardholder to conduct various types of transactions using a single card that has a single, unique, arbitrary identification number. The transactions may include purchases and payments. All of the transactions for a given billing period (e.g. month) may be consolidated on a single billing statement. The consumer can make a single payment to the TCPC or may make individual payments directly to the vendors.

17 Claims, 6 Drawing Sheets

ELECTRONIC TRANSACTION SYSTEM

CROSS-REFERENCE TO RELATED APPLICATIONS

Not Applicable.

STATEMENT RE: FEDERALLY SPONSORED RESEARCH/DEVELOPMENT

Not Applicable.

BACKGROUND OF THE INVENTION

Citizens/consumers require a multitude of cards to perform their transactions and services in the economy. For example, a typical adult citizen will have a social security card, a driver's license, an automobile insurance card, a health insurance card, one or more recognized credit cards that can be used at a variety of establishments (e.g., Visa®, MasterCard®, American Express®), credit cards that can be used at a particular establishment (e.g., department store credit cards and gas station credit cards), one or more bank cards (which may be credit, debit, ATM or some combination thereof). Most consumers will have other cards as well, for example, library cards, automobile club cards, video store cards, member organization cards (e.g., bar association card). Carrying and keeping track of such a plethora of cards is inconvenient. Carrying all of these cards takes up a lot of room in the consumer's wallet. As an alternative, a consumer may only carry some of the cards at any given time. However, the consumer may discover that he/she is not carrying a particular card when it is needed or desired. Furthermore, if the item (e.g., wallet or purse) holding the consumer's cards is lost or stolen, it is very burdensome for the consumer to contact all the required organizations in order to cancel existing credit cards and obtain replacements for the lost or stolen cards.

Therefore, a need exists for a system or method to consolidate cards typically used by a consumer.

Furthermore, use of the plethora of cards results in a plethora of bills. This means more inconvenience and time required by the consumer to pay all of the various bills each month. In addition to the valuable time used by a consumer each month to pay all of these bills, the consumer must spend money to pay for the postage and banking fees for paying all of the monthly bills. Thus, there is also a need for consolidating payments resulting both from the use of the many cards (e.g., credit cards, healthcare, insurance, etc.) typically used by a consumer and by the consumer's monthly payments, such as rent or mortgage, electricity, gas, water, etc.

BRIEF SUMMARY OF THE INVENTION

An all-purpose transaction system using a universal card and payments is disclosed herein. The universal card is issued by a universal card processing center (TCPC) and can be used for various purposes and to conduct a variety of transactions, such as retail transactions, financial transactions, security purposes, information purposes, civil purposes and for other purposes. The universal card allows a consumer/cardholder to conduct various types of transactions using a single card that has a single, unique, arbitrary identification number.

One of the transactions for which the cardholder may use the universal card is a purchase transaction. The cardholder can use the card to pay for the purchase using a variety of payment methods (instruments). A given consumer may have one or more methods (instruments) available to him/her. For example, a consumer/cardholder may use the card to make purchases charged to one or more of the cardholder's credit card accounts, one or more bank accounts (e.g., debit card transactions associated with an account, such as a checking or savings account) and/or one or more vendor charge accounts including his/her current vendor accounts.

When the cardholder wishes to use the universal card to conduct a purchase transaction, an identification of the cardholder is obtained from the cardholder's universal card. The universal card has human readable information (e.g., the cardholder's name and identification number) printed on the card. Additional, machine readable information, such as a personal identification number (PIN) or password can also be stored on the universal card.

A payment method (e.g., debit, credit card or vendor credit account) is selected by the cardholder. If there are multiple accounts available for the selected payment method, account identification is obtained from the cardholder.

A purchase authorization request is transmitted to the TCPC. The purchase authorization request includes an identification of the cardholder, the transaction amount, the transaction payment method, and the account identification if required.

A purchase authorization status is received from the TCPC.

If the purchase authorization status is an authorized status, the purchase transaction for the cardholder is completed using the transaction payment method.

The purchase transaction described above may be conducted using a point-of-sale terminal.

The purchase transaction may be a retail transaction.

A consolidated billing statement may be prepared for the cardholder. The consolidated billing statement includes all of the transactions for a billing period for all transactions using the universal card and all designated periodic or other payments. The cardholder can receive a single statement and send a single payment to the TCPC and have the TCPC disseminate the appropriate funds to each of the vendors. Alternatively, the cardholder can make separate payments directly to each of the vendors.

A universal card is issued to the consumer (cardholder). Transactions (such as purchase transactions as described above and payments received from the consumer) are processed for the consumer during a periodic billing period (e.g., a monthly billing period). As described above, the processing of a purchase transaction comprises receiving a purchase authorization request from a respective vendor, determining an authorization status based on whether there are sufficient funds to effectuate the purchase for the transaction amount using the transaction payment method, transmitting the authorization status to the respective vendor, and receiving a transaction complete message from the vendor, the transaction complete message comprising purchase transaction information including the identification of the consumer, the transaction amount and the transaction payment method.

The transaction information for each transaction during the billing period is stored.

A universal card billing statement is prepared upon completion of the periodic billing period. The universal card billing statement includes information about all of the transactions (e.g., purchase transactions and payments) made by the consumer using the universal card during the periodic billing period and all designated periodic or other payments.

BRIEF DESCRIPTION OF THE DRAWINGS

These as well as other features of the present invention will become more apparent upon reference to the drawings wherein.

DETAILED DESCRIPTION OF THE INVENTION

An all-purpose consumer transaction system is shown and described herein. The all-purpose consumer transaction system allows a consumer to use one card (referred to herein as a "universal card") for typical citizen/consumer transactions, e.g., purchases normally charged to one or more credit cards, charge cards, debit cards, health card, insurance card, etc. Exemplary embodiments of the all-purpose consumer transaction system also include consolidation of all vendor statements into a single billing statement so that the consumer does not have to provide payment to each of the institutions directly.

Figure 1:
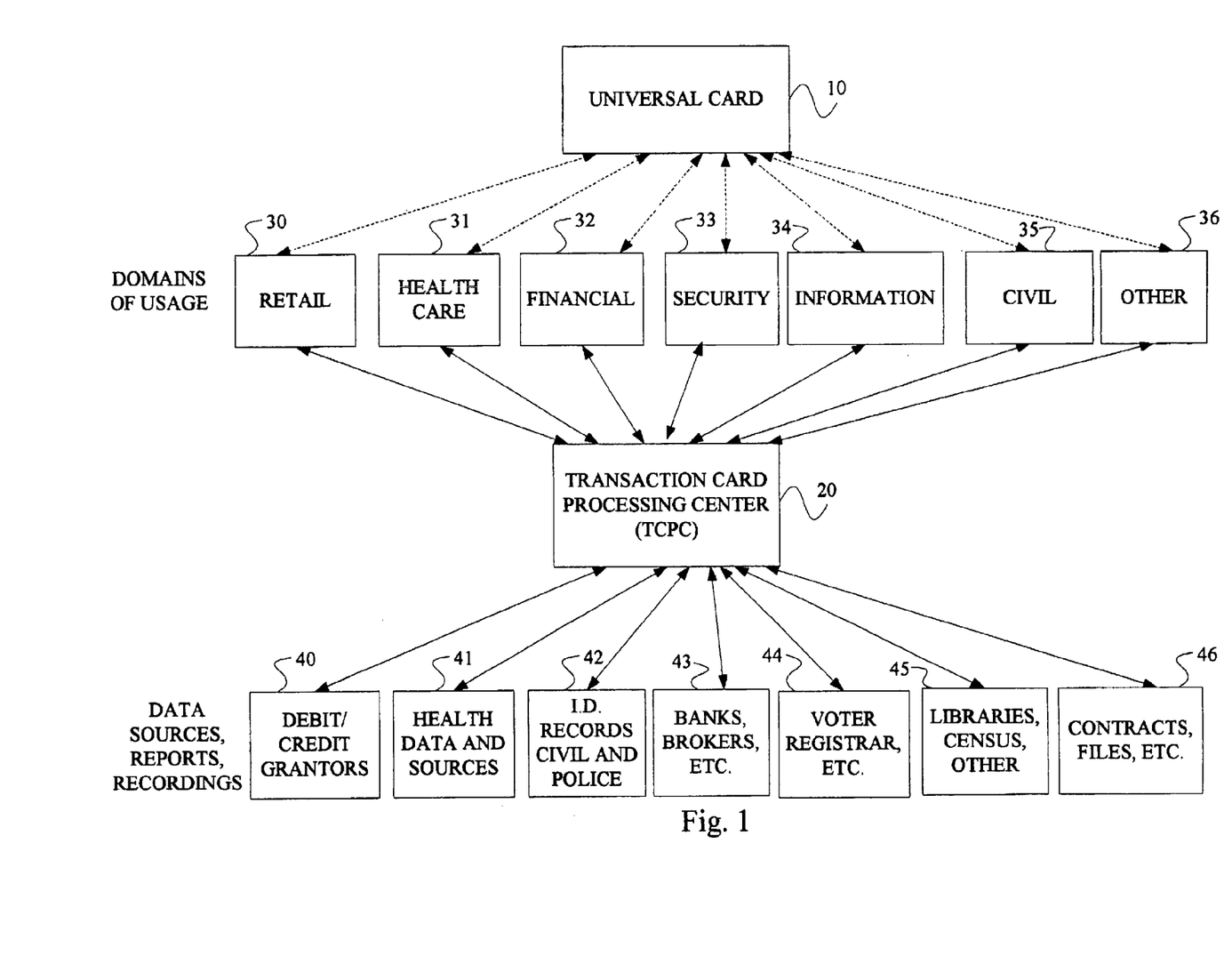
FIG. 1 is a block diagram illustrating exemplary domains of usage and data sources for use with a universal card as described herein.

Referring now to the drawings wherein the showings are for purposes of illustrating preferred embodiments of the present invention only, and not for purposes of limiting the same, FIG. 1 is a block diagram illustrating exemplary domains of usage of an all-purpose card transaction system in which a consumer uses a single universal card 10 to conduct all of the transactions which were previously conducted using multiple cards. FIG. 1 illustrates various domains of usage 30, 31, 32, 34, 34, 35, 36 of the universal card 10. A universal card processing center (TCPC) 20 (issuer of the universal card) processes the transactions for which the consumer uses the universal card 10. FIG. 1 also illustrates exemplary data sources, reports and recordings 40, 41, 42, 43, 44, 45, 46 for the domains of usage 30, 31, 32, 33, 34, 35, 36 of universal card 10. Within the system, each individual consumer carries and uses a single card 10. In exemplary embodiments, the universal card 10 is a plastic card that is similar to a conventional credit card.

As shown in FIG. 1, exemplary domains of usage for the card include: retail transactions 30, health care transactions 31, financial resource transactions 32, security or identification purposes 33, gaining access to information 34, gaining access to civil information 35, and gaining access to other services 36. It will be appreciated that different and/or additional domains of usage may be used in various embodiments.

The consumer can use the universal card 10 for any type of retail transaction 30 including carrying out each and all types of consumer transactions using only one card for all such types and uses. These uses include: accessing any of the cardholder's accounts for whatever purpose the cardholder desires. The accounts may include checking accounts, savings accounts, money market accounts and loans. The accounts may be from one or more financial institutions such as banks, credit unions, finance companies or other financial institutions. For example, the cardholder may use the universal card 10 to access a funding card system, such as Visa®, MasterCard® or American Express® or to access a loan account, such as a loan at a credit union, a bank or a finance company. The cardholder can use the access of the account to transfer funds for any transaction using any of the funding sources available to the cardholder. The funds are transferred to the vendor with whom the cardholder is conducting the financial transaction. Thus, with the universal card 10, the cardholder can access his/her loan or credit accounts, including but not limited to Visa®, MasterCard® and American Express® accounts to pay for any transaction with any merchant. The universal card can also be used for debit transactions, such as those from banks, credit unions, loan companies, etc.

The cardholder can use the same universal card 10 to access the cardholder's health care information 31 including accessing and verifying the cardholder's health insurance, verifying the cardholder's ability to finance any health care services, accessing and displaying the cardholder's health data and records, instantly and remotely, conveying health care information, such as written reports, charts, X-rays, etc., to any health care provider. The universal card 10 can be used to access financial resources of the cardholder's healthcare insurance, including Medicare.

The cardholder can use the universal card 10 to access his/her financial resources 32 and transfer or use those resources for any of the cardholder's purposes, e.g., paying for retail purchases, paying for health care services, etc.

The cardholder can use the universal card 10 for identification or security purposes 33, such as admission to any business, government or other secure area. For example, the card could be used to allow the identified cardholder onto a scheduled airline flight.

The universal card 10 could be used to gain access to information 34, such as at a public library to a public file or other source for which positive identification and/or payment are required. Thus, the universal card 10 could be used as a "library card" with a built-in payment feature. This could include both on-site and remote access and payment. Such a "library card" with built-in payment could also be used for other types of borrowing or renting, for example, the universal card 10 could be used at one or more video stores.

The universal card 10 could also be used to gain access to civil information and services 35, such as access to a wedding license, access to wills filed with the state, access to property deed records, etc.

The universal card 10 could also be used to gain access to other services 36. Some examples include access to foundations, museums, etc.

The TCPC 20 provides services through a combination of (1) instruments added to existing transaction systems, such as point-of-sale (POS) systems; (2) new computer servers connected to the POS instruments and having new programs to perform the services described above; and (3) new connections to data sources, such as banks, merchants, finance companies, etc.

An example of an instrument added to an existing transaction system could include the installation of a selection processor at each POS terminal. The selection processor would receive input of one or more numerals from the POS terminal keyboard. These numerals could be input by the cardholder or by a sales clerk. The numerals would identify the type of transaction to be processed for the cardholder. For example, a debit card (cash equivalent) payment, a credit card payment or an in-house charge account payment. Another example of an instrument that could be added to existing POS terminals is the addition of a computer server that allows new services to be rendered at the POS terminal. The computer server could be a minimal computer/printer that provides information responses to the POS terminal for the benefit of the cardholder and/or the POS operator. For example, the computer server could print out basic information for the cardholder, such as health data, library names, locations of data, etc. Such a computer server and printer could be used to allow for more explicit or detailed inquiries and responses for specific transactions. For example, the computer server could be used to provide amounts and terms of funds to be supplied for a transaction, details about the product or service, such as the size and color of a product, details of the customer's requirements, etc.

In exemplary embodiments, the universal cards 10 are issued and/or sponsored by an agent of choice by the TCPC 20. The choice will be based upon the agent's potential contribution to expanding and enhancing the value of the operations. This value is established by three variables: (1) the number of affiliates of the agent, for example, the number of alumni that are members of an agent that is an alumni association; (2) the average income of the members; and (3) the relative dedication of the members to generating benefits for their association. Each issuee/cardholder of the universal card 10 may use his/her universal card 10 for purchases at locations having POS terminals for use of such cards. In alternative embodiments, a POS terminal may not be used. For example, the transaction may be processed manually or by using a computer, such as the cardholder's personal computer or a computer at a vendor's location.

Whenever an issuee uses his/her universal card 10 for a purchase, he/she will present and swipe his/her universal card 10 through the POS terminal, as is now the practice with existing cards (e.g., credit and debit cards). The only difference from the user's perspective is that when the universal card 10 is swiped, the user (cardholder or clerk handling the transaction) will have some additional inputs indicating which account he/she wishes to access. For example, the user may access any of the cardholder's credit card accounts, any of the cardholder's debit card accounts or any of his/her loan accounts. In addition to the type of account being accessed (e.g., credit, debit, loan), the user enters an indication of which account within the selected account type is to be used.

After the issuee has entered the account information, the POS terminal dials the telephone or access number to the central file at which the account numbers are stored. The TCPC 20 accepts and reads the message and performs appropriate action based on the received request. The TCPC 20 retrieves information from a database based on the account selection information for the issuee.

The TCPC 20 then dials or connects to the account issuer's account control center (ACC) which is the source of information for those accounts.

The ACC receives the inquiry that has come from the POS terminal. The ACC then follows its standard procedure to select the prescribed response to the inquiry from the POS terminal for the card issuee and the cardholder's account status. The ACC sends its response via the connected access line from the TCPC 20. The TCPC 20 transmits the ACC response to the POS. The transaction is completed in its standard procedure beginning at the POS and depositing net proceeds to the vendor's account, via the sponsor or depository account and from the issuee's accounts. The actual steps are determined based on whether the transaction is a debit, credit, loan or other transaction. Furthermore, the steps vary based on the domain of usage.

Figure 2:
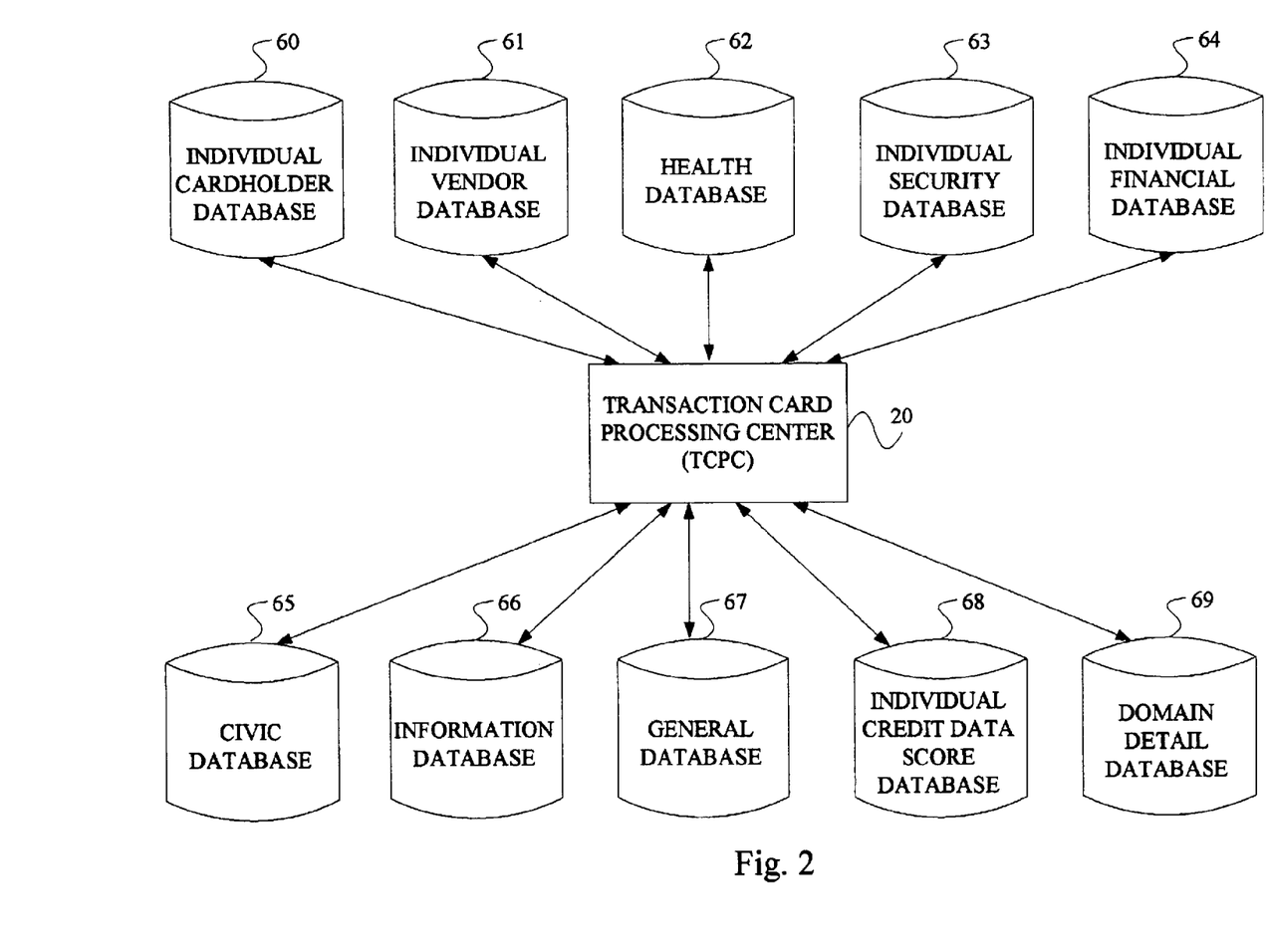
FIG. 2 is a block diagram illustrating exemplary databases for storing data for an all-purpose consumer transaction system using a universal card.

Information about the various vendors and cardholders is stored in one or more databases. FIG. 2 illustrates exemplary databases for use in the all-purpose transaction system using a universal card 10 described herein. In exemplary embodiments, the information is stored at the TCPC 20. In exemplary embodiments, the databases include: an individual's card database 60; a vendor database for individuals 61; a health database 62; a security database 63; a financial database 64; a civic database 65; an information database 66 and a general database 67. It will be appreciated that alternative embodiments may use different databases (e.g., combine or split up some of the databases described herein).

The individual's card database 60 includes data that summarizes the issuee's identification information on his/her universal card 10. In exemplary embodiments, this information includes the issuee's password, the issuee's personal universal identification number (PUIN), the issuee's address, e-mail address and telephone number(s). The individual's card database also includes a subfile for each merchant with whom the issuee has or has decided to have as an authorized vendor for him/her. Each subfile includes a summary of the issuee's transactions, credit history and credit status with the vendor. The individual's card database also includes a list of the identification numbers and codes of those vendors that serve the cardholder. The individual's card database also includes a summary credit status score that is reflective of the issuee's overall credit score with all of the cardholder's creditors. Each of the vendors/creditors is identified by a number indicating the domain of usage in which the vendor operates, e.g., retail, health care, etc.

A database of summaries of individuals' credit data 68 stores summary data for each individual in all of the domains of usage for the issuee. The information is recorded in summary form under the issuee's PUIN in the summary database.

An individual's domain detail database 69 stores detailed data on each individual in each domain of usage. This information is currently stored at the site of each server (vendor) of the individual in each domain. In exemplary embodiments, this data is in a compatible format with that of the vendor and is accessible by the vendor.

The vendor database 61 for individuals includes data that summarizes the information on all the card issuees relative to their experience and transaction history with their vendors, suppliers and other supporters. The health database 62 includes data that summarizes information on each individual that elects to use the healthcare domain 31. The security database 63 includes data that summarizes the security status for each individual that elects to make use of the security domain 33. The financial database 64 includes data that summarizes the financial information on each individual that participates and each institution that serves the financial domain 32. The civic database 65 includes data that summarizes the civic information on all participating individuals and data sources that are available to the system. The information database 66 includes data on sources of information and information available from each source. The general database 67 includes a summary of sources of data on other entities, events and records.

As transactions are processed, each of the applicable databases is updated. All events (e.g., a purchase, failure to make a timely payment, etc.) are recorded in the appropriate database(s).

An exemplary purchase transaction occurs when the cardholder enters the premises of a vendor or server for whatever goods/services the cardholder wishes to purchase. When ready, the cardholder uses the universal card 10 to effectuate the purchase (i.e., to pay for the goods/services). To execute the purchase, the cardholder presents the card 10 to the clerk or otherwise presents the universal card 10 (e.g., swipes the card at a POS terminal). The POS display (or other display or communication mechanism) provides several prompts to which the clerk or cardholder enters appropriate responses. For example, the display may inquire as to the type of transaction (e.g., purchase). The display will ask for the payment method. In exemplary embodiments, the payment method may be: (1) a cash transfer or equivalent by check by use of the universal card 10 (debit card transaction); (2) a conventional/universal credit card charge (e.g., Visa®, MasterCard®, American Express®); (3) a charge against an existing account with the vendor; (4) instantly opening a charge account with the vendor using the universal card 10 and charging the purchase to the newly opened account.

If the cardholder opts to pay by cash or check (i.e., use the universal card 10 as a debit card), the purchase is paid for by a direct payment with funds that are withdrawn immediately from one of the cardholder's cash accounts at a bank or other financial institution with the transferal of the designated cash to the vendor's account at the vendor's bank or other depository. If the cardholder has more than one account with cash deposits then the cardholder selects which of the accounts with cash deposits to use for the transaction. The chosen account is then accessed. The system responds by sending a status indicating whether the desired amount of funds is available in the selected account. If the funds are available, the system completes the transaction by transferring the amount of funds from the cardholder's selected account to the vendor/server's account. If the funds are not available in the cardholder's selected account, the system advises the POS terminal. The terminal then flashes an indication that there are not available funds in the selected account. The customer can then select another account having cash or another form of payment in order to complete the purchase transaction. Such a method of payment eliminates the cardholder's need to carry cash, to carry and write a check, to carry and use a debit card or to invest in a prepaid card.

If the user selects the option of paying with a universal credit card, the cardholder intends to make a direct payment of cash or a guarantee thereof from one of his/her recognized credit card accounts (also referred to herein as "universal credit cards"), e.g., American Express®, MasterCard®, Visa®, Diners Club®, Discover®, etc. The clerk advises the cardholder whether the selected mode of payment (i.e., the selected credit card) is acceptable. The desired account is selected and the account is accessed. If funds or a guarantee of the funds is available to the cardholder from his/her account with the credit grantor, the system advises the POS terminal and the transaction is completed. Completion of the transaction includes recording the amount that the credit grantor agrees to pay the vendor with identification numbers and records. The POS terminal prints out a confirmation receipt for the cardholder to sign for the credit card issuer. The clerk keeps the signed original copy of the receipt and provides the cardholder with a copy. If the funds or a guarantee of the funds is not available, a message is sent to the POS terminal indicating that the selected account can not be used for the transaction. The user can then select another account or another method of payment. This method prevents the user from having to carry any or all of his/her credit cards.

If the cardholder wishes to pay by credit card, the account may be a charge account that the cardholder has with the vendor or an "in-house" account that the cardholder has with the vendor. If the user has both a charge account and an "in-house" account with the vendor, the cardholder selects the desired account. The system accesses the appropriate account and requests approval of the transaction for the required amount of credit which is to be added to the cardholder's outstanding balance, if any. If the account is satisfactory, the system advises the POS terminal that the transaction is authorized and may be completed by registering the amount of credit granted to the cardholder per his/her agreed payment provisions. To complete the transaction, the POS terminal prints the charge receipt for the cardholder to sign. If the status indicates that the purchase amount can not be charged to the cardholder's account, the cardholder can select another method of payment. This option relieves the cardholder of the burden of carrying separate cards for each of the individual vendors with which the cardholder makes credit card purchases. If a vendor does not have an internal processing system for verifying a cardholder's credit, this processing can be performed by the TCPC 20.

If the cardholder wishes to use a credit card for a vendor but the cardholder does not have an account with the vendor, the cardholder can open a new account with the vendor. The clerk uses the POS terminal to signal that the cardholder wishes to authorize and open a new account. The system then searches for and finds the credit report status of the cardholder as recorded in the central summary file for the cardholder 60. The credit status report is copied and instantly forwarded to the credit department of the vendor and displayed to one of the vendor's credit analysts for the analyst's approval or denial. Depending on the vendor's criteria, the vendor credit analyst approves or denies the request for credit. If approved, a credit limit is also specified by the analyst. The analyst uses the cardholder's credit score in the summary file 68 and the credit score required by the vendor to decide whether to grant credit, and if so, how much credit to grant the cardholder seeking to open the new account. If the cardholder qualifies for credit equal to or exceeding the purchase transaction amount, the transaction is completed and the account is opened and the purchase is charged to the new account. If the cardholder does not qualify for credit or for credit sufficient to cover the purchase transaction amount, the cardholder can select an alternative method of payment. The credit amount granted may be based on standard credit rating scores, such as Fair, Isaac and Company (FICO) scores. The credit amount granted may also be based on different or additional criteria as determined by the vendor. The credit granted is recorded in the TCPC central summary database 60.

Figure 3:
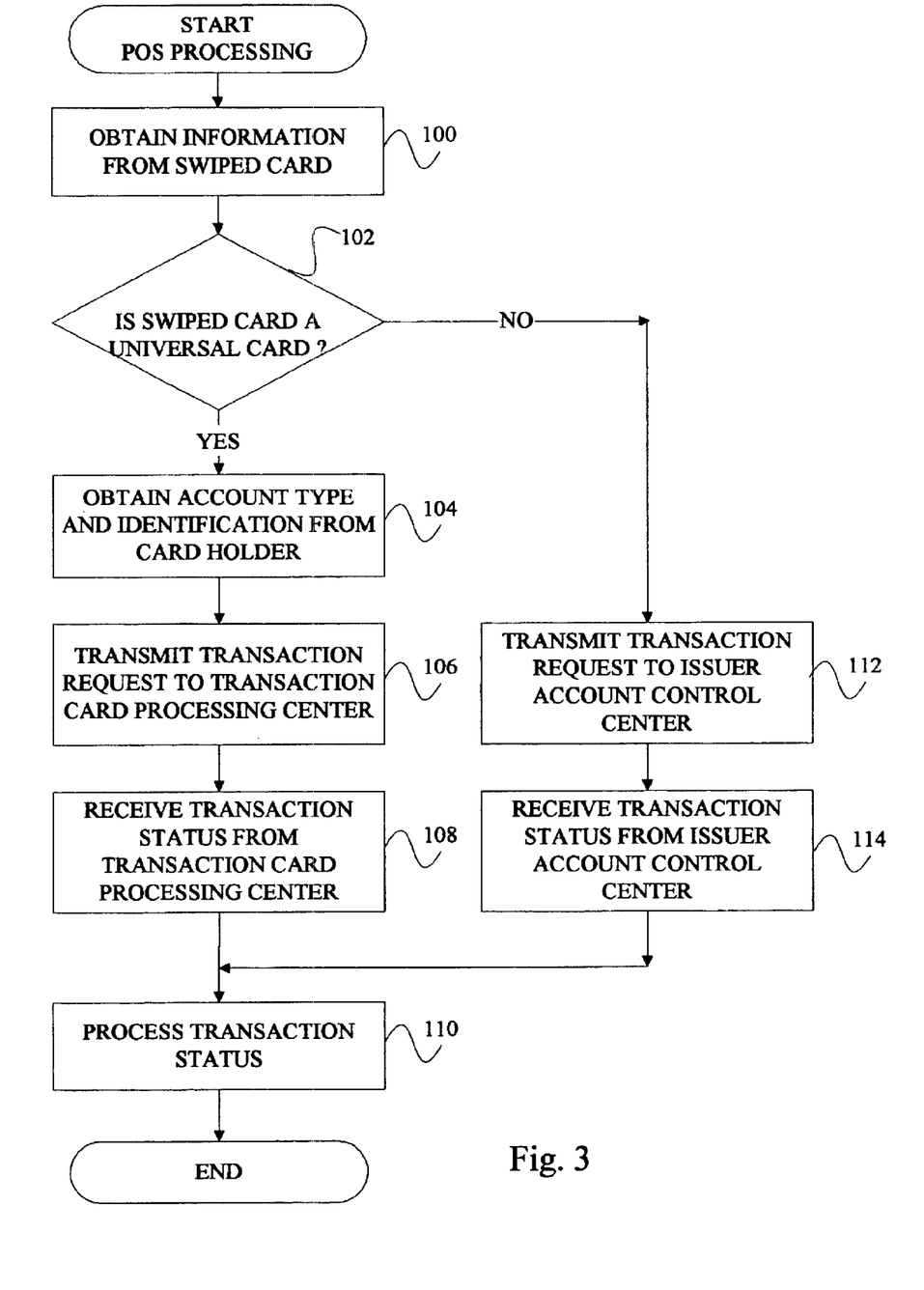
FIG. 3 is a flow diagram illustrating exemplary logic for a point-of-sales (POS) system for processing a transaction for a consumer using the universal card.

FIG. 3 is a flow diagram illustrating logic performed at a POS terminal when a cardholder uses a universal card 10. The same POS terminal and the same logic as that shown in FIG. 3 and described below can be used when the user uses other existing payment methods, such as credit cards or debit cards. The logic performed at the POS terminal runs each time a card is swiped at the POS terminal.

Figure 5:
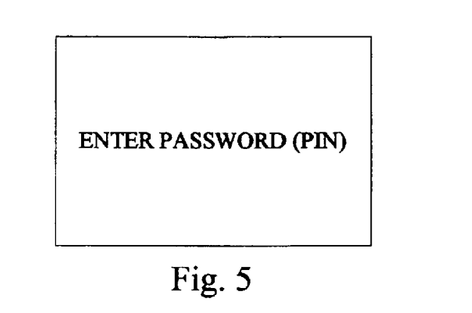
FIGS. 5–8 illustrate exemplary POS display screens displayed to a customer using the universal card for a transaction as exemplified by the logic shown in FIG. 3.

Once the card is swiped, the logic of FIG. 3 moves from a start block to block 100 where information is obtained from the swiped card. This information includes the type of card, e.g., universal card, debit card, credit card, etc. and account identification information. For example if the card is a credit card, the information includes account identification information (account number), expiration date, etc. If the card is a universal card 10, the information includes user (issuee) identification information, such as the cardholder's identification number. As is standard procedure, when the user swipes a card, the POS terminal display prompts the user for some type of verification, e.g., entry of a password or personal identification number (PIN) as exemplified in the POS display shown in FIG. 5. After the user enters the password or PIN, the POS terminal validates the entered password or PIN. If the password or PIN is invalid, the POS terminal performs error processing, e.g., displays an error message and allows the user to re-enter a password or PIN.

Figure 6:
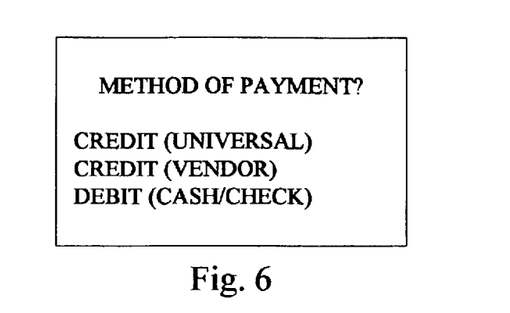
Figure 7:
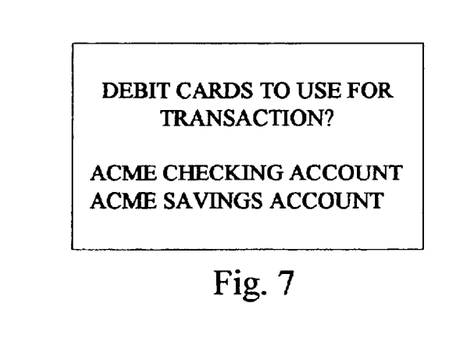

If the card is a universal card (yes in decision block 102), the logic of FIG. 3 moves to block 104. If the card being used for the transaction is a universal card 10, the cardholder will be asked for additional information (account type and account identification). See block 104. FIGS. 6 and 7 illustrate exemplary POS display screens for obtaining the account type (FIG. 6) and account identification (FIG. 7) from the cardholder.

Figure 4:
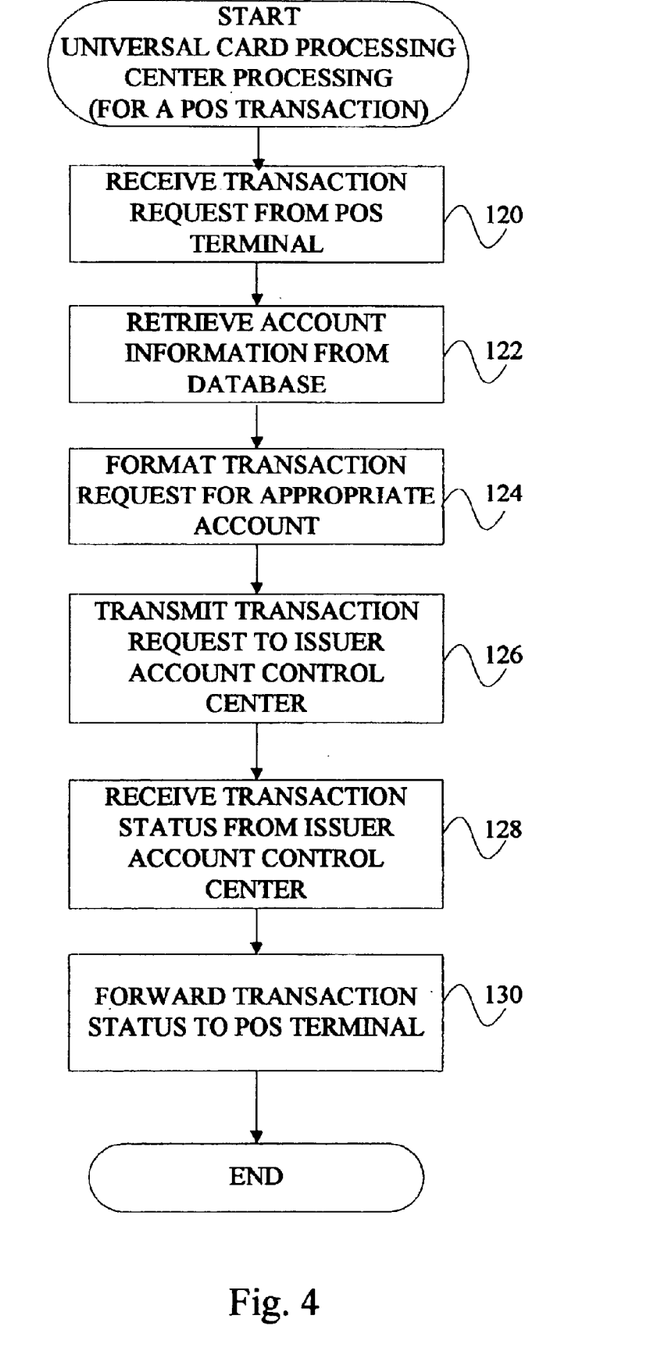
FIG. 4 is a flow diagram illustrating exemplary logic performed by a transaction card processing center (TCPC) for processing the transaction for the consumer using the POS system illustrated by the logic shown in FIG. 3.
Figure 8:
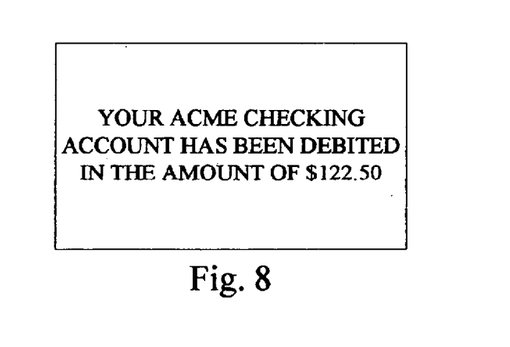

If the card being used for the transaction is a universal card 10, the transaction request is transmitted to the TCPC 20 (see block 106). The transaction request includes an identification of the card issuee, the type of account to be used, an identification of the account and the transaction amount. Logic performed by the TCPC 20 is shown in FIG. 4 and described later. The logic of FIG. 3 proceeds to block 108 where a transaction status is received from the TCPC 20. Examples of status include transaction completed and insufficient funds or credit to perform transaction. The logic then moves to block 110 where the transaction status is processed, for example by displaying the status on the POS terminal display as shown in FIG. 8. The logic of FIG. 3 then ends.

If the swiped card is not a universal card 10 (no in decision block 102), traditional POS terminal processing is performed as shown in FIG. 3. Such logic includes transmitting the transaction request to the issuer account control center (block 112), receiving the transaction status from the issuer ACC (block 114) and processing the transaction status received from the issuer ACC (block 110). The logic of FIG. 3 then ends.

FIG. 4 is a flow diagram illustrating exemplary logic performed by a TCPC 20 for processing a POS transaction request. As described above with reference to FIG. 3 (block 106), the POS terminal transmits a transaction request message to the TCPC 20. The TCPC 20 receives the transaction request (block 120). The transaction request includes an issuer identification, an identification of the account type, an account identification and a transaction amount. The logic moves to block 122 where account information is retrieved from a data base based on the information in the transaction request. A transaction request for the appropriate issuer ACC is then formatted (block 124) and transmitted to the appropriate issuer ACC (block 126). The logic then moves to block 128 where a status message is received from the issuer ACC. The logic then moves to block 130 where the transaction status received from the issuer ACC is forwarded to the POS terminal from which the transaction request was received. The logic of FIG. 3 then ends.

Figure 9:
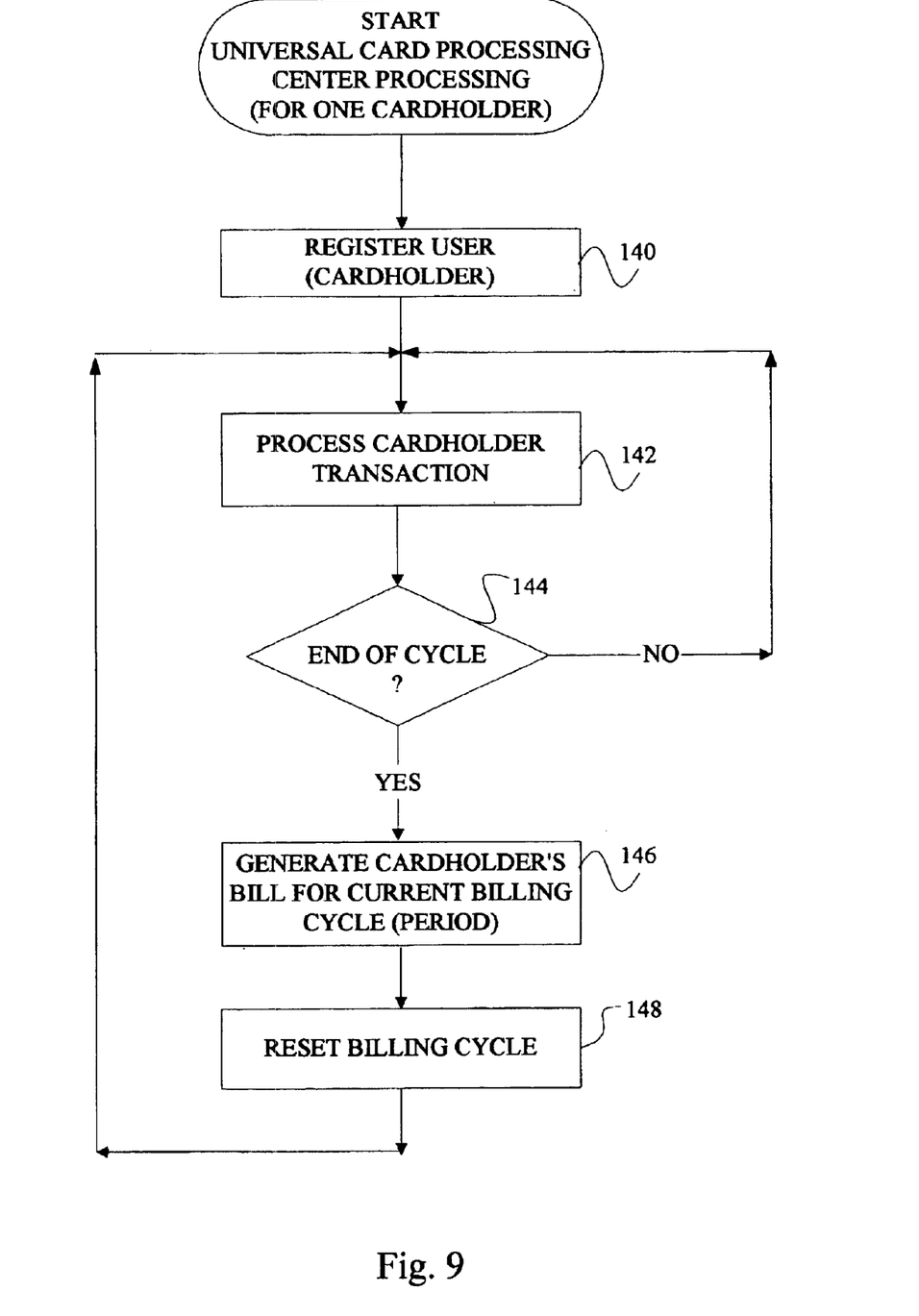
FIG. 9 is a flow diagram illustrating exemplary logic performed by a TCPC for registering a cardholder and processing the cardholder's transactions.

FIG. 9 is a flow diagram illustrating exemplary logic performed by the TCPC 20 for a single user (cardholder). For ease of understanding, it will be appreciated that the logic is shown for a single user. However, in actuality, the logic is performed for each user and the timing of when each step is performed for each user is transaction driven.

The logic of FIG. 9 moves from a start block to block 140 where the user/issuee/cardholder is registered. The user registration is the card issuance processing. A user is issued a card. Information about the user, such as the user's name, address, telephone number is stored in a database 60. Information about the user's accounts that can be accessed using the universal card 10 is also stored in a vendor database 61. The vendors for these accounts are notified of the cardholder's identification number for the universal card 10. For example, a given user may have information stored about a checking account including the bank identification and checking account number, loan information including the financial institution and the loan number, the name and identification of the cardholder's health insurance, the name and policy number of the cardholder's automobile insurance, etc. Since all of this information is accessible via the universal card 10, the user does not need to carry any of the cards received from the various sources 40 41, 42, 43, 44, 45, 46. A universal card 10 is generated. The universal card 10 has the issuee's name and PUIN printed on the card 10 (like a credit card). In addition, the universal card 10 has user information such as the user's password or PIN stored on the card in a manner that is not readable by a human but is machine-readable. The information may be stored on the card using any known method, such as one or more magnetic stripes, smart card chip, or any method developed in the future. In exemplary embodiments, the information stored on the universal card 10 in a machine-readable format includes the cardholder's PUIN and a password or PIN for the cardholder. In exemplary embodiments, the issuee may select his or her own PIN and/or modify the PIN.

Once the card has been issued, the cardholder can use the card for various transactions as described above. See block 142. The transaction is processed. For example, if the transaction is a retail purchase transaction initiated through a POS terminal, a transaction such as that shown in FIGS. 3 and 4 and described above is performed. As shown in FIG. 4, the transaction includes communications with the source (ACC).

As described above, in addition to purchase transactions, other transactions may be conducted. For example, the cardholder may add or delete a source 40, 41, 42, 43, 44, 45, 46. In such a case, the database information for the sources for the cardholder is updated. Other transactions include receipt of payment from the cardholder. Upon receipt of a payment, the TCPC 20 updates the records for the cardholder to deduct the payment received from the amount due from the cardholder. The TCPC 20 must also make payments to the source. In exemplary embodiments, this is done at the time the payment is received from the cardholder.

There are periodic billing cycles or periods. For example, most billing cycles are in one month increments. If it is the end of a billing period (yes in decision block 124), the logic moves to block 146 where a billing statement is prepared for the current billing period. All of the financial transactions for the cardholder can be compiled and presented to the cardholder on a single billing statement as described in further detail below. The logic then moves to block 148 where the billing cycle period is reset and the logic return to block 142. The logic of blocks 142–146 is repeated for each billing cycle.

As described above, exemplary embodiments of the all-purpose consumer transaction system provide a consolidated billing statement which provides convenience and savings for all cardholders and all participating vendors. The system allows all of the vendors that offer charge accounts to consumers or that render services payable monthly to be able to bill all of those cardholders with a common monthly statement in one mailing. That one mailing combines and consolidates all of the bills from all of the vendors for any one consumer into just one monthly combined statement or bill for that consumer. This consolidation of billing statements reduces monthly postage costs, statement preparation costs, labor costs and stationery costs for each of the vendors. For example, for a merchant with 100,000 bills sent monthly to its customers, the cost savings in postage alone is approximately $37,000.

The benefits of the all purpose consumer transaction system for the cardholder include: reducing the labor time required to pay monthly bills; reducing the number and cost of checks to write for paying the monthly bills; reducing the number and cost of postage stamps required for mailing of monthly payments; and reducing the time and cost for maintaining and balancing their bank account(s). For example, if a consumer has twenty monthly payments, the present postage costs are $7.40. Check charges are typically about $2.00 per month. Plus, the consumer must take the time to write out each individual check. This time is typically two minutes per check, which would constitute a total of forty minutes per month for a consumer writing twenty checks a month. With the all-purpose consumer transaction service, the consumer/cardholder receives one monthly statement which requires the writing of one check and the use of one stamp. Alternatively, the consumer can still send payments directly to each vendor identified in the consolidated statement. In exemplary embodiments, the consumer has the option of paying via a computer or POS terminal.

Each consumer has one master number (PUIN) assigned to him/her for use in all of his/her accounts and transactions. That number is arbitrary and is assigned in cooperation with the cardholder's affiliated organizations and/or institutions.

The TCPC 20 notifies the cardholder's affiliated organizations and institutions of the cardholder's master number (PUIN) and the cardholder's desire to receive a consolidated billing statement from the TCPC 20.

The vendors (organizations and institutions) prepare their monthly billing statements as usual. However, instead of preparing individual bills, the vendors sort the records into sequence based on the universal account number (PUIN) for each consumer/cardholder.

The media (e.g., tape or disk) with the account information is delivered to the TCPC 20 where it is integrated into a master file of all vendors' customers. The master file is sequenced by customer universal account number (PUIN).

The TCPC 20 prepares a periodic (e.g., monthly) master statement with all transactions for each cardholder at each vendor listed with the total due from the customer to each vendor and for all vendors. The total due for all vendors is posted as the total due.

Each cardholder may choose to pay all of his/her bills with one check or to write individual checks for each vendor. In exemplary embodiments, the user can write a single check for less than the total amount and specify the allocation of the payments.

In exemplary embodiments, the TCPC 20 processes the checks received and transfers received funds to the appropriate vendors on a daily basis.

In exemplary embodiments, the data stored on the universal card 10 identifies the individual and is limited to the individual's name and PUIN (PUIN). This information is not confidential or limited. However, the cardholder should be diligent in not disseminating this information. In exemplary embodiments, additional information is stored on the card but is not readable by the human eye. For example, the universal card 10 can include a second magnetic stripe. This second magnetic stripe can contain and encode critical information such as an identification of the card issuee, the card issuee's critical emergency information, such as telephone number, contact person and information, critical health data, blood type, etc.

In exemplary embodiments, both vendors and cardholders provide revenue to the TCPC 20. The amount paid by both the vendors and cardholders is less than what each currently spends in the processing of monthly billing statements. For example, each vendor may pay the TCPC 20 one third of the monthly savings realized by the vendor and each consumer may pay the TCPC 20 twenty percent of the consumer's monthly savings. For example, if 100,000 consumers (families) each receive ten monthly bills form ten vendors/suppliers, the TCPC's revenue from vendors would be $166,000 based upon the following cost assumptions (10 vendors X 0.50 saving per bill X 0.33 (⅓ of savings) X 100,000 (number of families) per month. From consumers, the TCPC's revenue could be $66,600 (100,000 (number of families X 9 (difference between number of checks required to write) X 0.37 (postage savings) X 0.20 (20% paid to TCPC)) per month. This would be a total of $232,600 ($166,000+$66,600) per month or $2,791,200 a year revenue for the TCPC 20 for the above example. The savings to each vendor on these assumptions would be about twice the amount of revenue received by the TCPC 20 from that vendor and the savings to each consumer is about five times the revenue received by the TCPC 20 from the consumer.

While the exemplary embodiment described herein is described with reference to a purchase transaction using a point-of-sale (POS) terminal, it will be appreciated that purchase transactions using the universal card can be effectuated in other ways, for example manually or via a home computer. It will also be appreciated that the universal card 10 can be used for purposes/transactions other than purchase transactions. For example, the universal card can be used for identification purposes or to gain access or entry to a particular location or to gain access to specific information.

Additional modifications and improvements of the present invention may also be apparent to those of ordinary skill in the art. Thus, the particular combination of parts described and illustrated herein is intended to represent only a certain embodiment of the present invention, and is not intended to serve as a limitation of alternative devices within the spirit and scope of the invention.

What is claimed is:

1. A method for a cardholder to effectuate a purchase transaction with a vendor for a transaction amount utilizing a universal card and at least one data source being selected from the group consisting of debit/credit grantors, health data and sources, identification records, civil and police, banks and brokers, voter registrar, libraries, census and contracts, the method comprising:

obtaining identification of the cardholder from the universal card, the universal card being issued by a transaction card processing center and allowing the cardholder to select a transaction payment method for effectuating the transaction;

obtaining from the cardholder the transaction payment method to be used for the purchase transaction;

determining if there are multiple accounts that can be used for the transaction payment method obtained from the cardholder;

if there are multiple accounts that can be used for the transaction payment method, obtaining an account identification from the cardholder to be used for the purchase transaction;

transmitting a purchase authorization request to the transaction card processing center, the purchase authorization request comprising the identification of the cardholder, the transaction amount, the transaction payment method, and the account identification if required;

receiving from the transaction card processing center a purchase authorization status;

selectively accessing information from the data source in response to the purchase authorization status:

if the purchase authorization status is an authorized status, completing the purchase transaction for the cardholder using the transaction payment method and providing the information accessed from the data source;

sending a transaction complete message to the transaction card processing center;

recording the purchase transaction and the information accessed from the data source on a database being selected from the group consisting of an individual cardholder database, an individual vendor database, a health database, an individual security database, an individual financial database, a civic database, an information database, a general database, an individual credit score database, and a domain detail database;

selectively displaying for the cardholder a display of the transaction completed with the universal card, the display being accessible from the transaction card processing center and accessing the database whereon the transaction has been recorded for displaying the transaction recorded on the database; and selectively printing the transaction presented on the display in response to utilizing a printer being in communication with the display.

2. The method of claim 1, wherein the payment method is selected from a plurality of payment method types selected from the group consisting of debit card, universal credit card and vendor credit card.

3. The method of claim 1, wherein the purchase transaction is conducted using a point-of-sale terminal.

4. The method of claim 1, wherein the purchase transaction is selected from the group consisting of a retail transaction, a healthcare transaction, a financial transaction, a security transaction, an information transaction, and a civil transaction.

5. A method for consolidating periodic billing statements and payments for a plurality of vendors of a consumer utilizing a universal card, the method comprising:

issuing the universal card to the consumer, the universal card being issued by a transaction card processing center, the universal card allowing the consumer to effectuate at least one transaction and thereby selectively access information from at least one data source being selected from the group consisting of debit/credit grantors, health data and sources, identification records, civil and police, banks and brokers, voter registrar, libraries, census and contracts, the transaction and the information accessed from the data source being recorded on at least one database, the database being selected from the group consisting of an individual cardholder database, an individual vendor database, a health database, an individual security database, an individual financial database, a civic database, an information database, a general database, an individual credit score database, and a domain detail database;

processing transactions for the consumer during a periodic billing period;

selectively accessing information from the database in response to the processing of transactions; and preparing a universal card billing statement upon completion of the periodic billing period, the universal card billing statement including the transaction and information accessed from the respective data source as recorded in the database during the periodic billing period and being organized for review by the consumer.

6. The method of claim 5, wherein the transactions comprise purchase transactions, each purchase transaction comprising:

receiving a purchase authorization request from a respective vendor, the purchase authorization request comprising an identification of the consumer, a transaction amount, a transaction payment method selected and an account identification if there is more than one account available to the consumer for the transaction payment method;

determining an authorization status in response to the based on whether there are sufficient funds to effectuate the purchase for the transaction amount using the transaction payment method;

transmitting the authorization status to the respective vendor; and receiving a transaction complete message from the vendor, the transaction complete message comprising purchase transaction information including the identification of the consumer, the transaction amount and the transaction payment method; and storing the transaction information in at least one of the individual cardholder database, the individual vendor database, the individual finance database, the information database, and the individual credit score database.

7. The method of claim 5, wherein the transactions comprise payment transactions, each payment transaction comprising:

receiving a payment;

determining vendors to which at least a portion of the payment are to be allocated;

determining the portion of the payment to be allocated to each of the vendors;

transmitting the allocated portion of the funds to each of the vendors; and storing information about the payment transaction in at least one of the individual cardholder database, the individual vendor database, the individual finance database, the information database, and the individual credit score database.

8. The method of claim 5, wherein the plurality of payment method types is selected from the group consisting of debit card, universal credit card and vendor credit card.

9. The method of claim 5 wherein the transaction includes retrieving information from one of the health data and sources and civil data sources and providing the information retrieved in the universal card billing statement.

10. A method for a cardholder to effectuate a transaction utilizing a universal card and to access at least one data source, the method comprising:

obtaining identification of the cardholder from the universal card being issued by a transaction card processing center and including a plurality of domains of usage;

obtaining from the cardholder the domain of usage for the transaction;

determining if there are multiple accounts that can be used for the domain of usage obtained from the cardholder;

if there are multiple accounts that can be used for the domain of usage, obtaining from the cardholder an account identification to be used for the transaction;

obtaining from the cardholder a request of information to be accessed from the data source by the transaction card processing center;

transmitting an authorization request to the transaction card processing center, the authorization request comprising the identification of the cardholder, the domain of usage, the request of information, and the account identification if required;

processing the authorization request to provide a transaction authorization status to the cardholder;

selectively accessing the data source in response to the transaction authorization status;

receiving from the transaction card processing center the transaction authorization status;

if the transaction authorization status is an authorized status, completing the transaction for the cardholder using the transaction method and providing the requested information accessed from the data source;

sending a transaction complete message to the transaction card processing center;

recording the transaction on a database at the transaction card processing center;

updating the database at the transaction processing center; and providing for the cardholder a selectively accessible display of the transaction completed with the universal card, the display being accessible from the transaction card processing center and accessing the database whereon the transaction has been recorded for displaying the transaction recorded on the database.

11. The method of claim 10 wherein the database is selected from the group consisting of an individual cardholder database, an individual vendor database, a health database, an individual security database, an individual financial database, a civic database, an information database, a general database, an individual credit score database, and a domain detail database.

12. The method of claim 10 wherein the data source is selected from the group consisting of debit/credit grantors, health data and sources, identification records, civil and police, banks and brokers, voter registrar, libraries, census and contracts.

13. The method of claim 10 further including selectively displaying for the cardholder a display of the transaction completed with the universal card, the display being accessible from the transaction card processing center and accessing the database whereon the transaction has been recorded for displaying the transaction recorded on the database.

14. The method of claim 13 further including selectively printing the transaction presented on the display in response to utilizing a printer being in communication with the display.

15. The method of claim 10 wherein the domain of usage is selected from the group consisting of retail, health care, financial, security, information and civil.

16. The method of claim 15 wherein the civil data source includes information selected from the group consisting of library information, civil license information, property deed information, access information, and state records information.

17. The method of claim 15 wherein the health data and sources data source includes one of health care information and financial information regarding healthcare insurance.

* * * * *